United States Patent [19]

Schlecht

[11] Patent Number: 5,242,700

[45] Date of Patent: Sep. 7, 1993

[54] TREATMENT OF EXTRACTS OBTAINED BY SPLIT EXTRACTION OF COFFEE

[75] Inventor: Klaus Schlecht, Orbe, Switzerland

[73] Assignee: Nestec S.A., Vevey, Switzerland

[21] Appl. No.: 953,565

[22] Filed: Sep. 29, 1992

[30] Foreign Application Priority Data

Oct. 24, 1991 [EP] European Pat. Off. ........ 91118123.8

[51] Int. Cl.$^5$ ............................................. A23F 5/26
[52] U.S. Cl. ........................ 426/387; 426/434; 426/388; 426/386
[58] Field of Search ............... 426/434, 387, 386, 388

[56] References Cited

U.S. PATENT DOCUMENTS

| | | | |
|---|---|---|---|
| 3,790,689 | 2/1974 | Pitchon et al. | 426/434 |
| 3,810,766 | 5/1974 | Holzberg | 426/386 |
| 3,965,269 | 6/1976 | Lee et al. | 426/434 X |
| 4,763,580 | 6/1987 | Matsuda et al. | 426/434 X |

FOREIGN PATENT DOCUMENTS 0056174 7/1982 European Pat. Off.
0352842 1/1990 European Pat. Off.

OTHER PUBLICATIONS

Sivetz, et al., Coffee Processing Technology, vol. 1, The AVI Publishing Company, Inc., Westport, Conn. 1963, pp. 262, 263.

*Primary Examiner*—Joseph Golian
*Attorney, Agent, or Firm*—Vogt & O'Donnell

[57] ABSTRACT

Roast and ground coffee is extracted by a split extraction process to obtain an extract from an atmospheric stage and an extract from a pressure stage. The extract produced by the atmospheric stage is evaporatively concentrated to a dry matter content of above 35% by weight, and the evaporation vapors produced during evaporative concentration are condensed and concentrated. The extract produced by the pressure stage also is evaporatively concentrated to increase its dry matter concentration to a dry matter concentration below 25% by weight. The two concentrated extracts then are mixed, and that mixture is evaporatively concentrated to a dry matter concentration of more than 40% by weight. The condensed and concentrated vapors obtained from evaporative concentration of the atmospheric stage are introduced into the evaporatively concentrated mixture or into a powder obtained from the concentrated mixture.

8 Claims, 1 Drawing Sheet 5,242,700

TREATMENT OF EXTRACTS OBTAINED BY SPLIT EXTRACTION OF COFFEE

BACKGROUND OF THE INVENTION

This invention relates to a process for the production of soluble instant coffee in powder form.

Soluble coffee powder is conventionally produced by freeze-drying or spray-drying after evaporation of a coffee extract obtained by the percolation of an extraction liquid through cells filled with ground roasted coffee. (Sivetz, Coffee Processing Technology, Volume 1, pages 262, 263, AVI, 1963).

Extraction is carried out in countercurrent fashion, (i.e., water under pressure at a temperature of 150° to 180° C. is introduced into the cell containing the batch of ground roasted coffee which has been most intensively extracted (having undergone N extractions) at the bottom of that cell and then the liquid extract of this extraction cell is passed through the extraction cell containing the batch of coffee which has been extracted (N−1) times, and so on, until the liquid extract passes through the cell which has just been filled with fresh ground roasted coffee and the final extract leaves the last cell at a temperature on the order of 100° C.

The final extract leaves this last cell at a temperature of the order of 100° C.

In such countercurrent extraction, most intensively extracted coffee is thus subjected to the highest temperature while the fresh coffee is subjected to the lowest temperature.

A distinction is normally drawn between the pressure stage, which is also known as the autoclave section and which consists of cells containing the most intensively extracted coffee, and the atmospheric stage which consists of cells containing the least intensively extracted coffee.

After each extraction cycle, the cell containing the most intensively extracted coffee is emptied, filled with fresh coffee, and after the cells have been suitably interconnected, another extraction cycle begins.

Accordingly, only one extraction liquid is used in this conventional extraction process.

In another process known as split extraction, two extraction liquids are used, the extraction cells being divided into a pressure stage and an atmospheric stage. Each stage is extracted with its own extraction liquid.

The coffee in the atmospheric stage is extracted with a first extraction liquid under moderate temperature and pressure conditions while the coffee in the pressure stage is extracted with a second extraction liquid under much higher temperature and pressure conditions.

One such process is described, for example, in U.S. Pat. No. 3,790,689.

Two different liquid extracts are thus produced, and after partial evaporation of the extract from the pressure stage, the two different liquid extracts may be combined with one another and subsequently converted into powder form by conventional processes, for example by spray drying or freeze drying.

It is possible by this process to obtain a coffee having distinctly improved organoleptic qualities, in particular by virtue of the fact that the extraction liquid of the atmospheric stage is free from compounds extracted in the pressure stage.

In the process according to U.S. Pat. No. 3,790,689, the extract from the atmospheric stage is not subjected to split evaporation whereas the extract from the pressure stage undergoes evaporation to bring it dry matter content to around 50%. The two extracts are then mixed to produce a final extract having a dry matter content of around 25%. The extract obtained is then concentrated by evaporation before being converted into powder form. During this evaporation step, the volatile compounds emanating from the extracts of the atmospheric stage and the pressure stage are lost. This is beneficial in the case of the volatile compounds from the pressure stage which are known to be the cause of unpleasant organoleptic characteristics of the end product. By contrast, this loss is penalizing in the case of the volatile compounds in the extract from the atmospheric stage which are responsible for agreeable organoleptic characteristics.

Various attempts have been made to produce a final extract after mixing which has a dry matter content of, or even exceeding, 30%, particularly with a view to reducing the amount of energy required for the final evaporation step before freeze drying or spray drying to bring the extract to a dry matter content of around 40% by weight or higher.

Unfortunately, all these attempts have been confronted by a problem which, in fact was already present in the process described in U.S. Pat. No. 3,790,689.

To be able to obtain a final mixture having the highest possible concentration, it is obviously necessary to subject each of the two extracts produced to an evaporation treatment.

Unfortunately, this involves two conflicting requirements. Firstly, excessive evaporation of the extract from the pressure stage results in blockage of the evaporators due to the particular composition of the extract. This is because, when it is desired to bring this extract to a concentration above 25% by weight, insoluble compounds appear in large quantities increase very rapidly with the concentration so that the evaporator is blocked and the process becomes unworkable on an industrial scale.

Secondly, this limitation of the evaporation of the extract from the pressure stage cannot be compensated by an increase in the evaporation of the extract from the atmospheric stage. The reason for this is that the extract from the atmospheric stage must not undergo excessive evaporation due to the loss of aromas this would involve. Unlike those in the extract from the pressure stage, the aromas in the atmospheric stage extract must be preserved at all costs.

It is for this reason that the process of split extraction has not yet been the subject of any real industrial development.

Accordingly, the object of the present invention was to solve this problem.

SUMMARY OF THE INVENTION

Now, it has been found that, under certain conditions, it is possible to evaporate the extract from the atmospheric stage of a split extraction system to a dry matter concentration of 40% by weight and only to evaporate the extract from the pressure stage to a dry matter concentration of around 20% by weight, so that a mixture is obtained which has a dry matter concentration in excess of 30% by weight and which may then be concentrated by evaporation and converted into powder form by any known process.

This is because the aroma-charged vapours produced by evaporation of the extract from the atmospheric stage can be recovered and condensed and the condensate can be concentrated by any known process, for example by cryo-concentration or by reverse osmosis.

The concentrate of aroma-charged vapours obtained may then be introduced, for example, into the liquid extract just before it is converted into powder form. It may also be contacted with an oil which fixes the aromas and which is then sprayed onto the coffee powder by a known process.

Accordingly, the present invention relates to a process for the production of soluble instant coffee in powder form by split extraction of ground roasted coffee in percolation cells to produce a first liquid extract from the atmospheric stage and a second liquid extract from the pressure stage, the first liquid extract then being evaporated to a dry matter concentration above 35% by weight and second liquid extract being evaporated to a dry matter concentration below 25% by weight, the two liquid extracts then being mixed and then evaporatively concentrated to a dry matter concentration of more than 40% by weight, the evaporation vapours of the first liquid extract being condensed and concentrated and the concentrate obtained being introduced into the process for converting the mixture into soluble coffee powder.

Other features and advantages will become apparent from the following description in conjunction with in the drawing FIGURE which is provided purely by way of example and which illustrates an installation for carrying out the process.

As shown by the drawing FIGURE, an extraction installation consists of several, preferably six, percolation cells which are charged with ground roasted coffee and which are interconnected by a suitable system of pipes. The extraction installation is divided into a first group of cells forming the atmospheric stage 1 and a second group of cells forming the pressure stage 2, the atmospheric stage 1 being supplied with extraction liquid through a pipe 11 and the liquid extract produced being removed through a pipe 12. Similarly, the pressure stage 2 has a feed pipe 21 and a discharge pipe 22.

A heater 3 may be provided at the exit of the atmospheric stage 1 to heat the liquid extract to a temperature of 95° to 98° C. The heated liquid extract may then be subjected to stripping with steam in a column 4, for example a plate column.

In this stripping phase, the liquid extract descends in countercurrent to an ascending flow of steam. The volatile compounds are entrained by the steam and are recovered by condensation of the steam without undergoing any of the aggressive heat effects produced by the subsequent evaporation treatments.

The liquid extract then passes into an evaporator 5 equipped with means 6 for condensing and concentrating the vapours produced, for example by cryoconcentration or reverse osmosis.

During this evaporation step, the dry matter content of the extract increases to more than 35% by weight. There is in fact no real limit to this concentration by evaporation. However, it has been found that, if the dry matter content reaches 50% by weight, the extract becomes too viscous to be able to be readily mixed thereafter with the extract from the pressure stage 2.

Similarly, at the exit of the pressure stage 2, the liquid extract enters an evaporator 7.

During this operation, the dry matter content of the extract from the pressure stage 2 is brought to 15-25% by weight and preferably to around 20% by weight.

The liquid extracts from the evaporators 5 and 7 are then mixed in a mixer 8, and the mixture obtained is further evaporated in an evaporator 9 to bring its dry matter content to around 40-45% by weight. There is in fact no real limit to this evaporation which is determined by the operating parameters of the installation for converting the extract into powder form.

The dry matter content of the extract from the atmospheric stage is preferably brought to around 40% by weight. There is in effect no need to subject the liquid extract from the atmospheric stage to an evaporation treatment which will bring its dry matter content into the vicinity of the dry matter content of the final mixture which is necessary for converting this mixture into powder form. More particularly, since the concentrated liquid extract from the atmospheric stage 1 is diluted in the concentrated liquid extract from the pressure stage 2, it is preferable not to subject this liquid extract from the atmospheric stage to two evaporation treatments which would take its dry matter content beyond 40% by weight.

Surprisingly, although it is not possible for the reasons explained above to concentrate the extract from the pressure stage 2 by evaporation to a dry matter content above 25% by weight, it is readily possible to concentrate the mixture of extracts from the atmospheric and pressure stages to more than 40%. Although not a definitive explanation, it would seem that this is due to the particular compounds present in the extract from the atmospheric stage which inhibit the formation of insoluble components from the compounds present in the extract from the pressure stage.

It is at the exit of the evaporator 9 that the concentrated evaporation condensate produced by the means 6 and the steam stripping product obtained in the column 4 are introduced into the final liquid extract before this extract is converted into powder form in a unit 10, for example a freeze-drying installation or a spray drying tower.

EXAMPLES

The following Table illustrates the application of the process according to the invention.

During these tests, the influence of the ratio R (weight of extract per cycle/weight of coffee per cell), also known as the draw-off, was tested for each of the extracts produced by the atmospheric and pressure stages. Similarly, the dry matter content Tc of the extracts before and after evaporation was measured, as was the dry matter content of the final mixture before evaporation and after evaporation before its conversion into powder form.

In this Table, the extract from the atmospheric stage is referred to as EF and the extract from the pressure stage as EC.

|    | R   | Tc (%) | Tc after evaporation (%) | Tc of mixture (%) | Tc of mixture after evaporation (%) |
|----|-----|--------|--------------------------|-------------------|-------------------------------------|
| EF | 5.0 | 5.6    | 41.3                     | 31.0              | 43.3                                |
| EC | 3.0 | 4.9    | 21.0                     |                   |                                     |
| EF | 5.0 | 5.5    | 41.0                     | 29.5              | 44.3                                |
| EC | 3.7 | 4.4    | 21.0                     |                   |                                     |
| EF | 5.0 | 5.6    | 41.0                     | 26.2              | 43.2                                |
| EC | 5.0 | 3.2    | 16.0                     |                   |                                     |
| EF | 3.2 | 8.4    | 40.0                     | 29.6              | 45.7                                |
| EC | 4.5 | 3.8    | 21.0                     |                   |                                     |
| EF | 1.0 | 16.4   | 40.0                     | 25.5              | 45.3                                |
| EC | 4.5 | 6.1    | 21.0                     |                   |                                     |

-continued

|    | R   | Tc (%) | Tc after evaporation (%) | Tc of mixture (%) | Tc of mixture after evaporation (%) |
|----|-----|--------|--------------------------|-------------------|-------------------------------------|
| EF | 1.0 | 17.1   | 40.0                     | 25.5              | 37.7                                |
| EC | 6.0 | 4.8    | 19.5                     |                   |                                     |
| EF | 2.0 | 9.6    | 40.0                     | 25.5              | 45.6                                |
| EC | 6.0 | 3.2    | 18.5                     |                   |                                     |
| EF | 2.5 | 10.2   | 40.0                     | 33.1              | 47.6                                |
| EC | 4.0 | 4.0    | 18.5                     |                   |                                     |
| EF | 3.5 | 7.7    | 40.0                     | 25.5              | 47.2                                |
| EC | 6.0 | 3.3    | 17.0                     |                   |                                     |

It can clearly be seen that it is possible by the process according to the invention to obtain a final extract having a dry matter content above 40% by weight obtained by split extraction in which the extract from the pressure stage is concentrated to a dry matter content of only around 20% by weight while the extract from the atmospheric stage is concentrated to a dry matter content of around 40% by weight without any denaturing of the atmospheric stage extract, of which the volatile compounds were recovered before the evaporation treatments and introduced thereafter while the volatile compounds in the extract from the pressure stage are eliminated.

I claim:

1. A process for preparation of soluble coffee in powder form comprising:
   split extracting roast and ground coffee in an extraction system having an atmospheric extraction stage and a pressure extraction stage to obtain a first extract from the atmospheric stage and a second extract from the pressure stage;
   evaporatively concentrating the first extract to obtain a first concentrated extract having a dry matter concentration above 35% by weight and condensing and concentrating evaporation vapors to obtain an aroma-charged concentrate;
   evaporatively concentrating the second extract to increase a dry matter concentration of the second extract up to an amount below 25% by weight to obtain a second concentrated extract;
   mixing the first and second concentrated extracts to obtain an extract mixture;
   evaporatively concentration the extract mixture to obtain a concentrated extract mixture having a dry matter concentration of more than 40% by weight;
   introducing the aroma-charged concentrate into the concentrated extract mixture; and
   converting the aroma-charged concentrated extract mixture into a powder.

2. A process for the production of soluble coffee in powder form comprising:
   split extracting roast and ground coffee in an extraction system having an atmospheric extraction stage and a pressure extraction stage to obtain a first extract from the atmospheric stage and a second extract from the pressure stage;
   evaporatively concentrating the first extract to obtain a first concentrated extract having a dry matter concentration about 35% by weight and condensing and concentrating evaporation vapors to obtain an aroma-charged concentrate;
   evaporatively concentrating the second extract to increase a dry matter concentration of the second extract up to an amount below 25% by weight to obtain a second concentrated extract;
   mixing the first and second concentrated extracts to obtain an extract mixture;
   evaporatively concentrating the extract mixture to obtain a concentrated extract mixture having a dry matter concentration of more than 40% by weight;
   converting the concentrated extract mixture into a powder; and
   introducing the aroma-charged concentrate into the powder.

3. A process according to claim 1 or 2 wherein the second extract is concentrated to a dry matter content of from 15% up to an amount below 25% by weight.

4. A process according to claim 1 or 2 wherein the first and second extracts are concentrated to have dry matter concentration so that upon mixing, the extract mixture has a dry matter concentration in excess of 30% by weight.

5. A process according to claim 1 or 2 further comprising, prior to concentrating the first extract, steam stripping the first extract, condensing volatile compounds stripped from the first extract to obtain condensed volatile compounds and incorporating the condensed volatile compounds into the concentrated mixture prior to converting the concentrated mixture into the powder.

6. A process according to claim 5 further comprising heating the first extract prior to steam stripping.

7. A process according to claim 1 further comprising contacting aroma-charged concentrate with an oil to fix aromas of the concentrate with the oil and then spraying the oil containing the oil-fixed aromas on the powder.

8. A process according to claim 2 further comprising contacting the aroma-charged concentrate with an oil to fix aromas of the concentrate with the oil and then spraying the oil containing the oil-fixed aromas on the powder.

* * * * *

UNITED STATES PATENT AND TRADEMARK OFFICE
CERTIFICATE OF CORRECTION

PATENT NO.   : 5,242,700
DATED        : September 7, 1993
INVENTOR(S)  : Klaus SCHLECHT It is certified that error appears in the above-indentified patent and that said Letters Patent is hereby corrected as shown below:

Column 1, delete lines 26 and 27.

Column 2, line 37, delete "increase" and insert therefore --and increase--.

Column 3, between lines 30 and 31, insert the following headings and new paragraph:

--BRIEF DESCRIPTION OF THE DRAWING

The drawing Figure schematically illustrates an apparatus system for treatment of extracts obtained by split extraction in accordance with the present invention.

Figure 1:
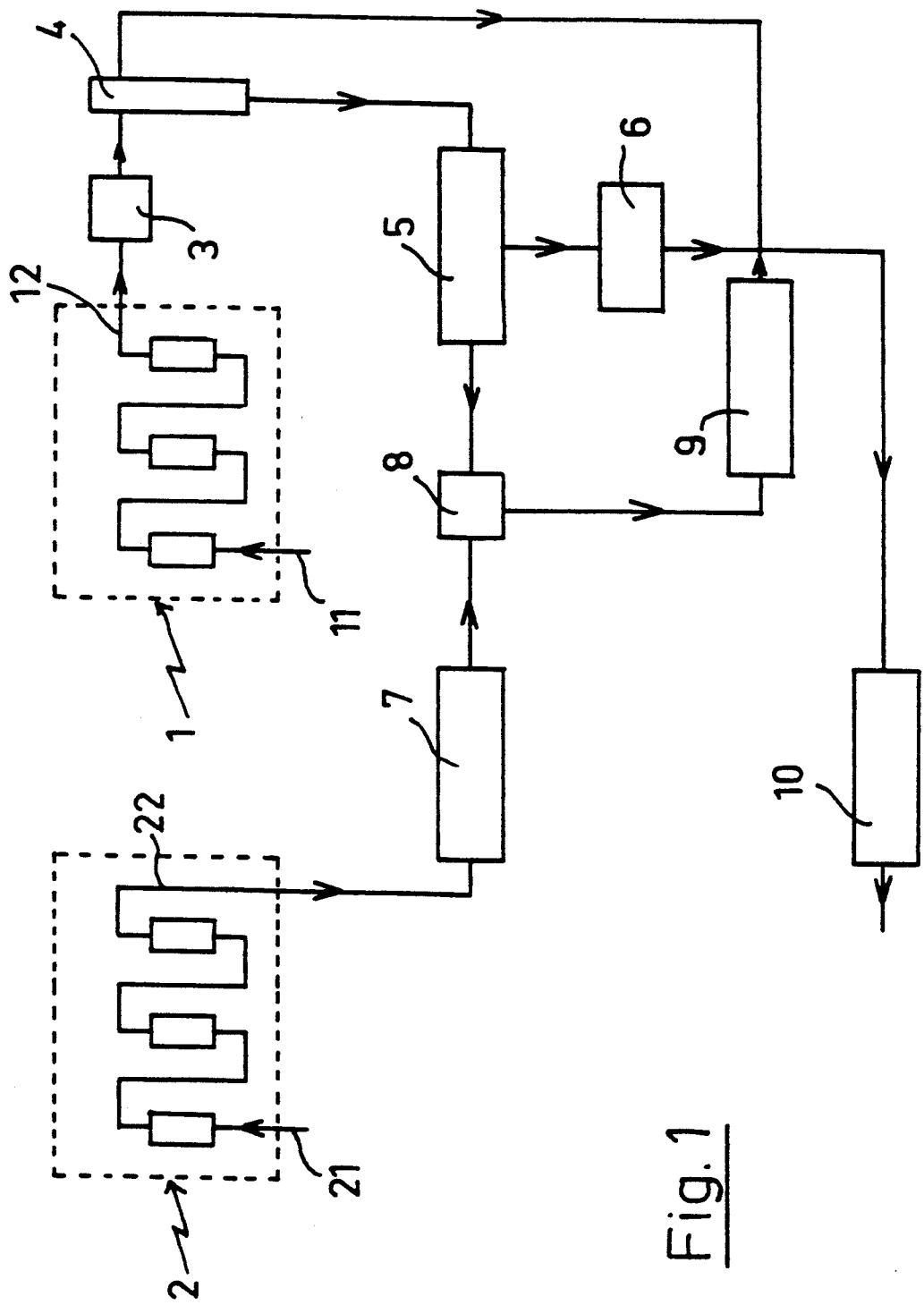

DETAILED DESCRIPTION OF THE DRAWING AND THE INVENTION--.

UNITED STATES PATENT AND TRADEMARK OFFICE
CERTIFICATE OF CORRECTION

PATENT NO. : 5,242,700
DATED : September 7, 1993
INVENTOR(S) : Klaus SCHLECHT

It is certified that error appears in the above-indentified patent and that said Letters Patent is hereby corrected as shown below:

Column 5, line 48, (line 19 of claim 2) change "concentration" to --concentrating--.

Column 5, line 51, (line 22 of claim 1), delete the first occurence of "the".

Column 6, line 10, (line 10 of claim 2) change "about" to --above--.

Column 6, line 24, delete the first occurrence of "the".

Signed and Sealed this

Nineteenth Day of April, 1994

Attest:

BRUCE LEHMAN

*Attesting Officer*      *Commissioner of Patents and Trademarks*